Figure 1:
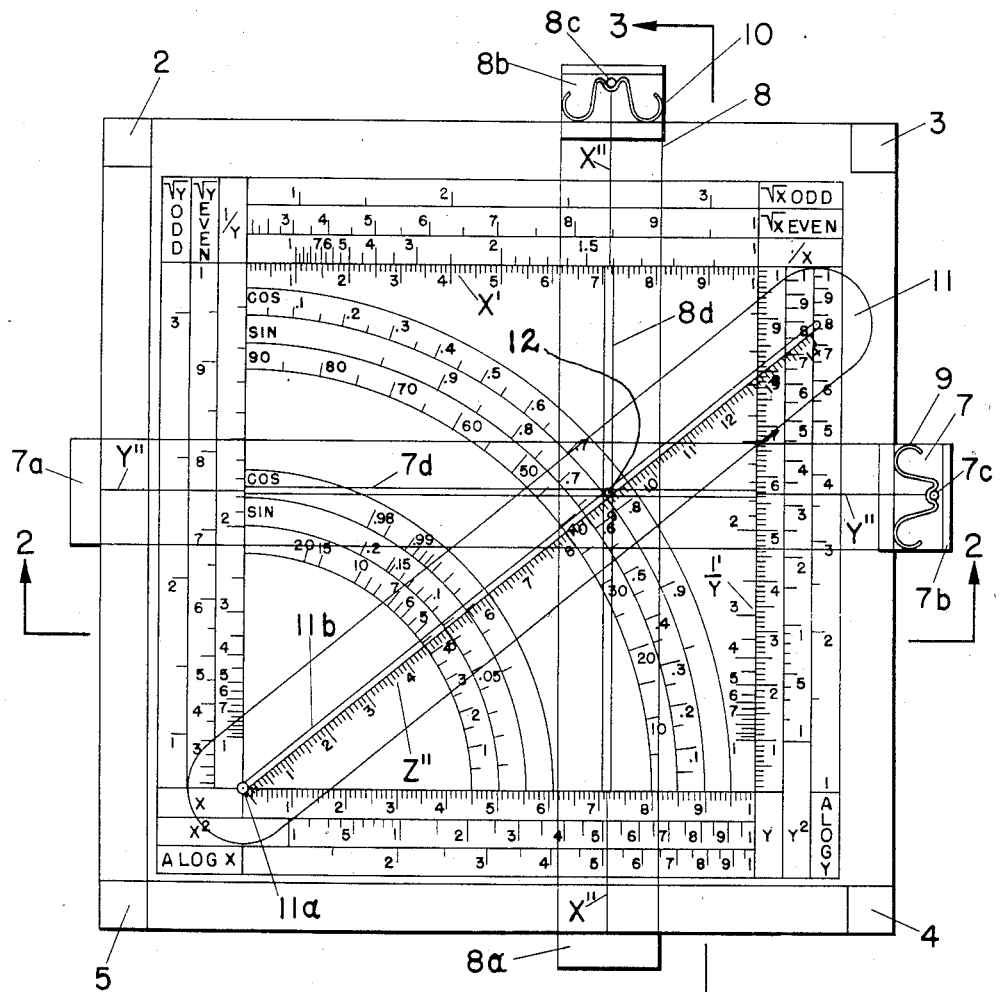

Feb. 17, 1948.  A. B. DOWNS, JR  2,436,352

CALCULATING DEVICE

Filed Feb. 15, 1947    2 Sheets-Sheet 1

Alfred B. Downs Jr.
INVENTOR.

BY
John B. Brady
ATTORNEY

Feb. 17, 1948.  A. B. DOWNS, JR  2,436,352
CALCULATING DEVICE
Filed Feb. 15, 1947  2 Sheets-Sheet 2

Alfred B Downs Jr.
INVENTOR.

BY John A. Brady
ATTORNEY

Patented Feb. 17, 1948

2,436,352

UNITED STATES PATENT OFFICE 2,436,352

CALCULATING DEVICE

Alfred Buckingham Downs, Jr., Columbus, Miss.

Application February 15, 1947, Serial No. 728,932

7 Claims. (Cl. 235—61)

My invention relates broadly to calculating devices and more particularly to a simplified construction of calculator which is extremely compact in size and which will permit the solution of problems and the determination of functions of wide variety.

Another object of my invention is to provide a compact construction of calculating device which may be readily manufactured from moldable plastic material which substantially encloses all of the operating members of the calculating device.

Another object of my invention is to provide a construction of calculating device including a substantially polygonal shaped frame having a pair of coacting slides operative in directions normal to each other and in coaction with a pivotally mounted angularly movable scale, said slides and angularly movable scale being operative over coactive scales carried by said frame structure.

Still another object of my invention is to provide a construction of calculating device having a multiplicity of coacting scales defined in a horizontal direction as $x$, $x^2$, the anti-logarithm of $x$, a duplicate $x$ scale, the reciprocal of $x$, the $\sqrt{x}$ in even quantities and the $\sqrt{x}$ in odd quantities; and defined in a vertical direction as the reciprocal of $y$, as $y$, $y^2$, the anti-logarithm of $y$, a duplicate reciprocal of $y$ scale, the $\sqrt{y}$ (in even quantities of $y$) and the $\sqrt{y}$ (of odd quantities of $y$); in combination with a diagonal scale graduating linearly in terms of $z$ and angularly adjustable in coaction with the movement of vertical and horizontal runners over the aforesaid scales and over an outer arc for the solution of angles having a side ratio of less than 10/1 for the measurement of trigonometric functions thereof and over an inner arc for the determination of angles having size ratio greater than 10/1 for the measurement of trigonometric functions thereof.

Still another object of my invention is to provide a construction of calculating device including a polygonally shaped frame structure for supporting and enclosing a multiplicity of horizontally and vertically arranged scales in coaction with arcuate scales enclosed thereby where the inner vertically and horizontally arranged scales are calibrated in terms of $1/x$ and $1/y$.

A still further object of my invention is to provide a construction of computing device which is provided with a multiplicity of coacting function scales and a multiplicity of hairline slides for coordinating the movement of the slides with respect to the function scales for rapidly solving mathematical and trigonometric problems.

Figure 4:
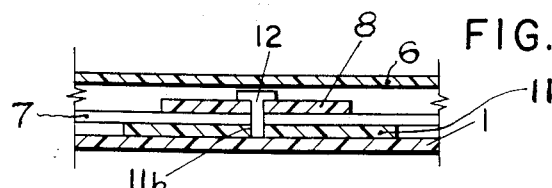
Figure 2:
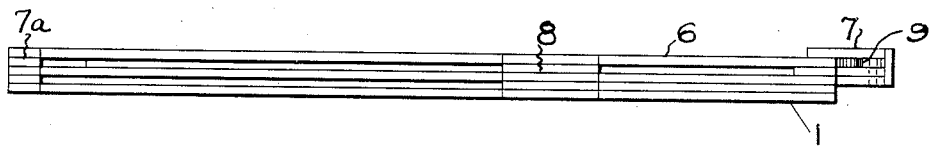
Figure 3:
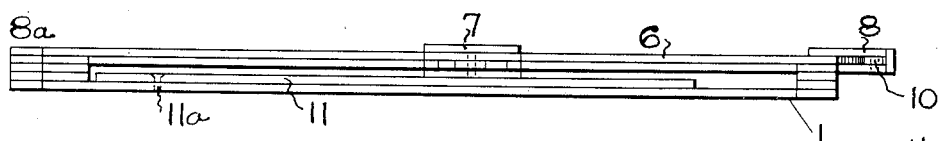
Figure 7:
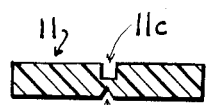
Figure 5:
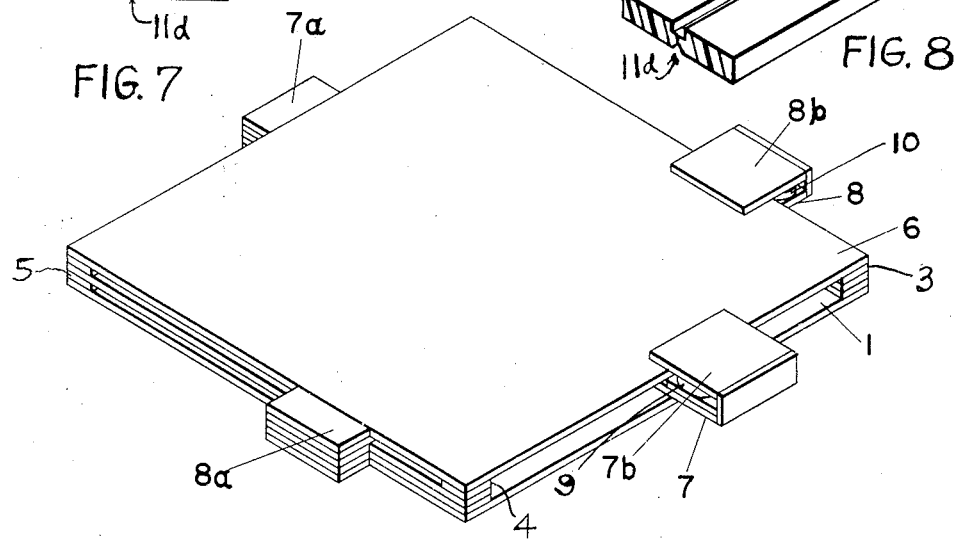
Figure 6:
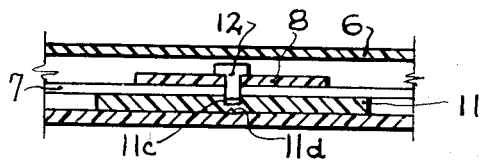

Other and further objects of my invention reside in a compact construction of computing scale as set forth more fully in the specification hereinafter following by reference to the accompanying drawings in which:

Figure 1 is a plan view of the calculating device of my invention; Fig. 2 is a transverse sectional view taken substantially on line 2—2 of Fig. 1; Fig. 3 is a transverse sectional view taken substantially on line 3—3 of Fig. 1; Fig. 4 is a fragmentary sectional view on an enlarged scale taken substantially on line 4—4 of Fig. 1 and illustrating the manner of coordinating the hairline movable members in the construction of my invention; Fig. 5 is a perspective view showing the polygonally shaped frame of the structure of my invention; Fig. 6 is a fragmentary sectional view similar to the view shown in Fig. 4, but illustrating a modified form of my invention in which the connecting means between the linearly movable scales and the angularly movable scale extends into a groove in the angularly movable scale rather than through a slot therein for providing for a longitudinally extending central hairline for precision reading; Fig. 7 is a transverse sectional view through the angularly movable scale illustrating the groove and central hairline formed in the scale; and Fig. 8 is a perspective view of a fragmentary part of the angularly movable scale showing the longitudinal groove and the hairline therein.

My invention embodies the following principles in a computation device for the stated purposes.

1. The trigonometric relation of the tangent of an angle or the reciprocal of the tangent to the two short sides for the purpose of multiplication or division of the quantities indicated by the length of the two sides; and/or the multiplication or division of the functions, square, square-root, reciprocal, logarithm, etc., of the above mentioned quantities.

2. The angular adjustment of a movable elongated member about the origin of the $x$ and $y$ axes to indicate the size and trigonometric functions of the included angle on scales provided for the purpose.

3. The angular adjustment of the aforementioned movable elongated member about the origin of the $x$ and $y$ axes to indicate the size and trigonometric functions for use when the ratio of sides, the tangent, is less than 1/10. These scales greatly facilitate the solution of problems involving angles of less than 6 degrees.

4. The point of intersection of the three hairlines to indicate the length of the hypotenuse, indicated on the scale along the hairline of the angularly adjustable member.

5. The function scales may be varied so that the device will apply more directly to any of many of the fields of engineering, mechanics and mathematics.

Referring to the drawings in detail, it will be noted that the device consists of:

A rectangular or square base 1 on which is printed or to which is fixed a number of graduated scales. The principal scales being the horizontal scale $x$, graduated linearly 0–10 left to right; the vertical scale $y$, graduated linearly 0–10 bottom to top; the horizontal scale $1/x$, graduated proportional to the tangent of the included angle; the horizontal scale $x'$, graduated linearly 0–10 left to right; the vertical scale $1/y'$, graduated proportional to the cotangent of the included angle; the group of arc scales for use when the ratio of the sides is greater than 1/10, graduated so that the hairline of the pivoted member 11 will indicate the included angle and its sine and cosine, the tangent is indicated on the $y$ or $1/x$ scales; and the other group of arc scales provided for use when the ratio of the sides, the tangent of the angle, is less than 1/10, graduated so that the angle, sine and cosine are indicated by the pivoted member 11, the numerical tangent is indicated on the $y$ or $1/x$ scale.

Function scales are also provided. They are parallel to the principal or base scales so that the desired function of a quantity is indicated along the hairline that indicates the principal or base number. These scales allow multiplication or division of the functions without reference to the base numbers.

The transparent movable elongated member 11 rests on the base 1 and pivots about the pin 11a at the origin of the $x$ and $y$ axes. Said member 11 is provided with a grooved slot 11b for the purpose of seating the moving pin 12. It is also provided with a linearly calibrated hairline which is calibrated along its length from zero, at the origin, to 14.14, the unit calibrations being the same as in other linear scales on the device.

The transparent movable elongated member 7 is provided with ends 7a and 7b which allow it to be slid vertically so that it is always parallel with the $x$ scales; and so that the Y" hairlines cross the $y$ and functions of $y$ scales at points equidistant from their origins and so that the Y" hairlines may cross every point along the $y$ or functions of $y$ scales. The elongated member 7 is provided with a slot 7d for the purpose of forming a runway for the moving pin 12.

The transparent movable elongated member 8 is provided with ends 8a and 8b which allow it to be slid horizontally so that it is always parallel with the $y$ scales; and so that the X" hairlines cross the $x$ and function of $x$ scales at points equidistant from their origins and so that the X hairlines may cross every point along the $x$ or function of $x$ scales. The elongated member 8 is provided with a slot 8d for the purpose of forming a runway for the moving pin 12.

Directions for the operation of the calculating device:

General explanation

1. This device is designed primarily for multiplication and division of numbers and/or their functions and for the solution of right triangles.

2. The horizontal scales are functions of $x$ and are intersected by the vertical hairline, or X" hairline. All $x$ readings are taken on the $x$ scale at the X" hairline. The setting is made by sliding the X" hairline horizontally.

3. The vertical scales are functions of $y$ and are intersected by the horizontal hairline, or Y" hairline. All $y$ readings are taken on the $y$ scale at the Y" hairline. The setting is made by sliding the Y" hairline up or down.

4. The $z$ scale is printed on the Z" hairline which rotates through a 90 degree arc. The Z" scale is used only in the solution of right triangles with sides ratio of less than 10/1, in which case the hypotenuse is indicated at the moving pin junction 12 of the X", Y" and Z" hairlines. In the solution of right triangles the Z" hairline indicates the angle, sine, and cosine on the outer arc scales, and the tangent on the $y$ or $1/x$ scales, either one it intersects.

5. In multiplication and division, $z$ readings are taken at the point where the Z" hairline intersects the $y$ or $1/x$ scales and $z$ readings where it intersects the $x$ or $1/y$ scales. The Z" hairline is set by moving either the X" or Y" hairline until the Z" hairline indicates the desired number on the $y$, $1/x$, $x$, or $1/y$ scales.

6. To set scale $z$ with the Y" hairline:

As the multiplier—set to desired reading on the scales $y$ or $1/x$;

As the divisor—set to desired reading on the scales $x'$ or $1/y'$.

7. To set scale $z$ with the X" hairline:

As the multiplier—set to desired reading on the scales $x'$ or $1/y'$;

As the divisor—set to desired reading on the scales $y$ or $1/x$.

Multiplication and division

8. There are three fundamental equations for use in multiplication or division:

(1) $xz=y$     (2) $yz=x$     (3) $1/y\ x=z$

It is seldom convenient to use Equation #3. Solve either of the equations for the unknown, set the two known quantities on the corresponding scales and read the result at the hairline indicated in the solution of the equation.

*Example 1.*—Multiply 6 by 7 using Equation #1 ($xz=y$). Set $x$ at 6 (paragraph 2) set $z$ at 7 (paragraphs 5 and 6) read product 42 at $y$ (paragraph 3).

*Example 2.*—Multiply 6 by 7 using Equation #2 ($yz=x$). Set $y$ at 6 (paragraph 3) set $z$ at 7 (paragraphs 5 and 7) read product 42 at $x$ (paragraph 2).

*Example 3.*—Divide 4 by 5 using Equation #1 ($xz=y$, $y/z=x$). Set $y$ at 4 (paragraph 3), set $z$ at 5 (paragraphs 5 and 7), read quotient .8 at $x$ (paragraph 2).

*Example 4.*—Divide 4 by 5 using Equation #2 ($yz=x$, $x/z=y$). Set $x$ at 4 (paragraph 2), set $z$ at 5 (paragraphs 5 and 6), read quotient .8 at $y$ (paragraph 3).

9. It is desirable that all results be indicated by either the X" or Y" hairline rather than Z" hairline. Therefore it is recommended that $z$ be used only as the multiplier or divisor. This procedure was used in the examples as paragraph #8. Set multiplicand or dividend with X" or Y" hairline, set $z$ as multiplier or divisor and read the product or quotient on the hairline which was used to set $z$. The other hairline can then be used to set $z$ (multiplier or divisor) for the next operation.

10. The following is an explanation of the solution of a typical problem.

Example: $\dfrac{25 \times 7 \times 4 \times 63}{47 \times 34}$

Set $y$ on 25, set $z$ to 34 (quotient is at $x$);

Set $z$ on 4 by using Y'' hairline; this multiplies the reading at $x$ by 4. The product is at $y$;

Set $z$ on 47 by using X'' hairline; this divides previous total by 47. The quotient is at $x$;

Set $z$ on 63 by using Y'' hairline; this multiplies total by 63. Product is at $y$;

Set $z$ on 7 using X'' hairline; this multiplies total by 7.

The final solution, 27.6, is at X'' hairline on the $x$ scale.

The order of the operations makes no difference. The above example is intended to show only one of the many methods possible.

*The function scales*

11. To determine the square root of a number containing an odd number of digits, set $y$ on the number and read the square root on the $\sqrt{y}$ odd scale at the Y'' hairline, extreme left vertical scale.

12. To determine the square root of a number containing an even number of digits, set $y$ on the number and read the square root on the $\sqrt{y}$ even scale at the Y'' hairline, center left vertical scale.

13. To determine the reciprocal of a number, set $y$ on the number and read the reciprocal on the $1/y$ or $1/y'$ scale at the hairline.

14. To determine the square of a number, set $y$ on the number and read the square on the $y^2$ scale at the hairline.

15. To determine the logarithm of a number, set Y'' hairline on the number on the anti-log $y$ scale and read the logarithm on the $y$ scale at the hairline; the anti-logarithm scale is the anti-log of the $y$ scale.

16. The operator will use other methods than the above. For instance, the square of a number can be determined by setting the number on one of the $\sqrt{y}$ scales and reading the square on the $y$ scale. The square root of a number can be found by setting the number on the $y^2$ scale and reading the square root on the $y$ scale, etc.

17. The operations described in paragraphs 11 to 16 inclusive can be performed with equal ease by using the X'' hairline and function scales.

18. It is possible to provide scales for many other functions of $x$ and $y$.

19. The simplest method of multiplying two functions of $x$ and $y$ is: set one function with X'' hairline, set the other function with the Y'' hairline, notice the reading on the $y$ scale and continue to move the Y'' hairline until the Z'' hairline intersects the $y$ scale at that point. Read the product on the $y$ scale at the Y'' hairline.

20. To divide two functions of $x$ and $y$, set dividend with the Y'' hairline, set divisor with X'' hairline and read quotient at $z$.

Example: $\dfrac{(2)^2}{\log^2}$

Solution: Set Y'' hairline on 2 on the $\sqrt{y}$ scale, set X'' hairline on 2 on the anti-logarithm $x$ scale and read quotient 13.3 at the Z'' hairline on the $1/x$ scale.

*Solution of right triangles (sides ratio of 10/1 or less)*

21. If two sides of a right triangle are known and set on the $x$ and $y$ scales, the length of the hypotenuse is indicated on the $z$ scale at the moving pin junction of X'', Y'' and Z'' hairlines. The angle, sine, and cosine are indicated on the outer arc scales by the Z'' hairlines, and the tangent is indicated by the Z'' hairline on the $y$ or $1/x$ scales.

22. It can be seen from paragraph 21 that if a side and angle, or side and function of an angle, or hypotenuse and side, or any two values are known and properly set, the unknown values will be indicated on their respective scales.

*Solution of right triangles (sides ratio greater than 10/1)*

23. When dealing with right triangles in which one of the angles is less than 6 degrees, it is convenient to use the scales on the inner arcs. The tangent is indicated on the $y$ scale at the Z'' hairline, but it must be remembered that in this case the sides ratio is greater than ten to one, so it is necessary to point off accordingly.

24. Whenever the inner arc scales are used, it is necessary that the short side be indicated on the $y$ scale.

25. The hypotenuse is not indicated on the $z$ scale when the inner arc scales are used.

The calculator of my invention is formed in a substantially polygonally shaped form built up from plastic material with spacers 2, 3, 4 and 5 in opposite corners thereof which serve to space the rectangular or square base plate 1 from the upper transparent plate 6. This allows the slidable adjustment of the hairline slide 7 in a longitudinal direction while hairline slide 8 may be adjusted in a transverse direction. The slides 7 and 8 are both provided with slidable abutments 7a and 8a and inwardly directed portions 7b and 8b which project over the transparent plate 6 as shown forming confining housings for the spring members 9 and 10 which are disposed between pin members 7c and 8c respectively and the peripheral edge of the transparent plate 6 enabling the adjustable slides to be maintained in adjusted position. The slides 7 and 8 and the angularly movable scale 11 are simultaneously movable by reason of the interconnection thereof through pin member 12 adapted to slide in the grooved slots in members 7, 8 and 11 as heretofore explained as the member 11 angularly shifts about the pivot point 11a thereof.

As heretofore explained the calculating device of my invention is extremely compact in construction. The size of the polygonally shaped frame measures approximately 5'' x 5'' by approximately $\tfrac{7}{16}$'' in thickness with but slight protuberance of the adjustable slides 7 and 8. The multiplicity of functions which may be performed with the computing device of my invention, together with the relatively small physical dimensions thereof makes the device very convenient for use on a large variety of problems.

In the form of my invention shown in Figs. 1–5, the angularly movable scale 11 has been explained as having a slot therein. This requires that the $z$ hairline be considered as simply the imaginary center of the slot 11b. In Figs. 6–8 I have shown a modified construction in which greater precision of operation is obtainable. In this form of my invention the angularly movable scale 11 has a longitudinally extending vertically disposed slot 11c in the top face of the scale 11 extending only partially into the scale. The pin member 12 in this arrangement is shortened and projects only partially into the groove 11c serving to guide the angularly movable scale 11 as the linear scales 7 and 8 slide longitudinally or transversely. The fact that the groove 11c is in the nature of a recess and not a slot wholly penetrating the thickness of scale 11 permits a hairline 11d to be recessed into scale 11 either from the under surface thereof at 11d or downwardly from the bottom of groove 11c. Such hairline is accurately located in the center of the groove 11c and scale 11 and thereby provides a precision reference line for effecting coordinated readings with the correlated scales. The slot 11d has been exaggerated in size for purposes of explaining the location of the hairline in scale 11. It will be understood that slot 11d may be a very fine slit or shallow surface recess filled with a coloring pigment which will readily show through the plastic material from which scale 11 is formed and through the transparent plastic associated slides and top plate 6 of the frame structure to facilitate precision readings of the several scales.

In operating the X'' or Y'' hairline to set the z reading, one frequently has the choice of making the required setting on either the vertical or horizontal scale. Experience is required to enable one to make the better choice, with the purpose of keeping the operation within the more easily read portions of the scales. Usually, this result is best obtained by selecting the number on the scale that will require the X'' or Y'' hairline to be moved toward or across the center of the device. And, likewise, when a series of operations are to be made, the same purpose can be achieved by a choice of the order in which the operations are performed.

While I have described my invention in one of its preferred embodiments I realize that modifications may be made in the details thereof and I desire that it be understood that no limitations upon my invention are intended other than may be imposed by the scope of the appended claims.

What I claim as new and desire to secure by Letters Patent of the United States is as follows:

1. A computing device comprising a pair of flat sheet-like panel members spaced one from another, at least one of said panel members being formed from transparent material and the other of said panel members carrying scales visible through said transparent panel members, a pair of slides extending between said panel members and slidable in paths substantially normal to each other, a scale pivotally mounted between said panel members and having calibrations thereon variably registerable with the scales on said second mentioned panel and a connection between said slides and said pivotally mounted scale for effecting simultaneous movement between said slides and pivotally mounted scale.

2. A computing device comprising a flat panel member carrying longitudinally and laterally arranged scales thereon, a transparent panel mounted in spaced relation to said aforementioned panel, a pair of strip-like slides mounted for longitudinal and transverse movement between said panels and each having hairlines registerable with the scales on said first mentioned panel, a graduated scale pivotally mounted between said panels and having pivotal connection with each of said slides, the graduations on said pivotally mounted scale being variably registerable with the scales on said first mentioned panel as said slides are selectively positioned with respect to the scales on said first mentioned panel.

3. A calculating device comprising a pair of panel members mounted in spaced parallel relation, one of said panel members carrying a multiplicity of coacting scales and the other of said panel members being transparent for viewing said scales therethrough, the scales on said first mentioned panel extending in a longitudinal direction and being designated as $x$, $x^2$ the antilogarithm of $x$, a duplicate $x$ scale, the reciprocal of $x$, the $\sqrt{x}$ (in even quantities of $x$) and the $\sqrt{x}$ (in odd quantities of $x$) and scales extending in a direction normal to the aforesaid scales and being designated as the reciprocal of $y$, as $y$, $y^2$, the anti-logarithm of $y$, a duplicate reciprocal of $y$ scale, the $\sqrt{y}$ (in even quantities of $y$) and the $\sqrt{y}$ (in odd quantities of $y$) and a diagonally extending scale graduated linearly in terms of $z$ and pivotally mounted between said panels to swing in an arc over the aforesaid scales with the graduations thereon variably registering with said scales, a longitudinally and transversely movable slide operating between said panels and having a pivotal connection with said diagonally extending scale and hairlines on both of said slides registerable with the scales on said first mentioned panel.

4. A calculating device comprising a pair of panel members mounted in spaced parallel relation, one of said panel members carrying a multiplicity of coacting scales and the other of said panel members being transparent for viewing said scales therethrough, the scales on said first mentioned panel extending in a longitudinal direction and being designated as $x$, $x^2$, the anti-logarithm of $x$, a duplicate $x$ scale, the reciprocal of $x$, the $\sqrt{x}$ (in even quantities of $x$) and the $\sqrt{x}$ (in odd quantities of $x$) and scales extending in a direction normal to the aforesaid scales and being designated as the reciprocal of $y$, as $y$, $y^2$, the antilogarithm of $y$, a duplicate reciprocal of $y$ scale, the $\sqrt{y}$ (in even quantities of $y$) and the $\sqrt{y}$ (in odd quantities of $\sqrt{y}$), a diagonally extending scale graduated linearly in terms of $z$ and pivotally mounted between said panels to swing in an arc over the aforesaid scales with the graduations thereon variably registering with said scales, a longitudinally and transversely movable slide operating between said panels and having a pivotal connection with said diagonally extending scale, hairlines on both of said slides registerable with the scales on said first mentioned panel and a multiplicity of arcuately arranged scales on said first mentioned panel, each having a pivot point on said diagonally extending scale as a center and calibrated according to trigonometric functions, said last mentioned calibrations being registerable with the linearly arranged graduations on said diagonally disposed scale.

5. A computing device comprising a panel member carrying a multiplicity of sets of graduated scales thereon extending in directions normal to each other, said sets of scales being disposed adjacent the marginal edges of said panel, one set of said scales being calibrated in accordance with $x$, $x^2$, and the anti-logarithm of $x$; another set of said scales being calibrated as the reciprocal of $x$, the $\sqrt{x}$ (in even quantities of $x$) and the $\sqrt{x}$ (in odd quantities of $x$); another set of said scales being calibrated as the reciprocal of $y$, as $y$, $y^2$ and the anti-logarithm of $y$; and the last set of said scales being calibrated in accordance with the reciprocal of $y$, the $\sqrt{y}$ (in even quantities of $y$) and the $\sqrt{y}$ (in odd quantities of $y$), a transparent panel extending over the aforesaid panel and allowing clear visibility of the aforesaid scales therethrough, a diagonally arranged scale pivotally mounted between said panels and having linear graduations thereon registerable with the aforesaid scales, a pair of slides each having a hairline thereon, one of said slides being movable longitudinally between said panels and the other of said slides being movable transversely between said panels and a pivotal connection between said slides and said diagonally arranged scale.

6. A computing device comprising a panel member carrying a multiplicity of sets of graduated scales thereon extending in directions normal to each other, said sets of scales being disposed adjacent the marginal edges of said panel, one set of said scales being calibrated in accordance with $x$, $x^2$, and the anti-logarithm of $x$; another set of said scales being calibrated as the reciprocal of $x$, the $\sqrt{x}$ (in even quantities of $x$) and the $\sqrt{x}$ (in odd quantities of $x$); another set of said scales being calibrated as the reciprocal of $y$, as $y$, $y^2$ and the anti-logarithm of $y$; and the last set of said scales being calibrated in accordance with the reciprocal of $y$, the $\sqrt{y}$ (in even quantities of $y$) and the $\sqrt{y}$ (in odd quantities of $y$), a transparent panel extending over the aforesaid panel and allowing clear visibility of the aforesaid scales therethrough, a diagonally arranged scale pivotally mounted between said panels and having linear graduations thereon registerable with the aforesaid scales, a pair of slides each having a hairline thereon, one of said slides being movable longitudinally between said panels and the other of said slides being movable transversely between said panels, a pivotal connection between said slides and said diagonally arranged scale and a plurality of arcuate scales carried by said first mentioned panel and formed on a radius coincident with the pivot of said diagonally arranged scale, said arcuate scales being calibrated in terms of trigonometric functions and adapted to be correlated with the graduations on said diagonal scale.

7. A computing device comprising a pair of flat sheet-like panel members spaced one from another, at least one of said panel members being formed from transparent material and the other of said panel members carrying scales visible through said transparent panel members, a pair of slides extending between said panel members and slidable in paths substantially normal to each other, a scale pivotally mounted between said panel members and having calibrations thereon variably registerable with the scales on said second mentioned panel, said pivotally mounted scale having a longitudinally extending groove therein, a pin-like member extending between said slides and projecting into the groove in said pivotally mounted scale and a hairline carried by said pivotally mounted scale in alignment with the center of said longitudinally extending groove, said slides and pivotally mounted scale being formed from transparent material for enabling visual registration to be made of the several calibrations on said slides, pivotally mounted scale and said panel members.

ALFRED BUCKINGHAM DOWNS, JR.